(12) United States Patent
Reinke et al.

(10) Patent No.: US 7,063,047 B2
(45) Date of Patent: Jun. 20, 2006

(54) FUEL VAPORIZER FOR A REFORMER TYPE FUEL CELL SYSTEM

(75) Inventors: Michael J. Reinke, Franklin, WI (US); Jeroen Valensa, New Berlin, WI (US)

(73) Assignee: Modine Manufacturing Company, Racine, WI (US)

( * ) Notice: Subject to any disclaimer, the term of this patent is extended or adjusted under 35 U.S.C. 154(b) by 176 days.

(21) Appl. No.: 10/663,409

(22) Filed: Sep. 16, 2003

(65) Prior Publication Data
US 2005/0056412 A1 Mar. 17, 2005

(51) Int. Cl.
*F28F 3/08* (2006.01)

(52) U.S. Cl. ............... 122/31.1; 165/146; 165/166; 165/167

(58) Field of Classification Search .......... 165/166, 165/167, 146, 147; 122/31.1
See application file for complete search history.

(56) References Cited

U.S. PATENT DOCUMENTS

| | | | |
|---|---|---|---|
| 2,566,310 A | 9/1951 | Burns et al. | |
| 3,256,704 A * | 6/1966 | Becker | 165/166 |
| 4,623,019 A | 11/1986 | Wiard | |
| 4,624,305 A | 11/1986 | Rójey | |
| 4,653,572 A * | 3/1987 | Bennett et al. | 165/146 |
| 4,700,771 A * | 10/1987 | Bennett et al. | 165/146 |
| 4,762,172 A | 8/1988 | Grehier et al. | |
| 5,078,209 A | 1/1992 | Kerkman et al. | |
| 5,193,611 A | 3/1993 | Hesselgreaves | |
| 5,242,016 A | 9/1993 | Voss et al. | |
| 5,401,589 A | 3/1995 | Palmer et al. | |
| 5,423,376 A | 6/1995 | Julien et al. | |
| 5,823,252 A | 10/1998 | Waitkat et al. | |
| 5,927,396 A | 7/1999 | Damsohn et al. | |
| 6,159,434 A | 12/2000 | Gonjo et al. | |
| 6,167,952 B1 | 1/2001 | Downing | |
| 2001/0030041 A1 | 10/2001 | Boneberg et al. | |

FOREIGN PATENT DOCUMENTS

| | | |
|---|---|---|
| DE | 35 08 240 A1 | 9/1986 |
| EP | 0 206 608 | 12/1986 |
| EP | 0 861 802 A2 | 9/1998 |
| EP | 0 952 419 A1 | 10/1999 |
| JP | 02-120205 | 5/1990 |

* cited by examiner

*Primary Examiner*—Leonard R. Leo
(74) *Attorney, Agent, or Firm*—Wood, Phillips, Katz, Clark & Mortimer

(57) ABSTRACT

Large thermal stresses are avoided and the fuel charge reduced in a vaporizer particularly suited for use in a reformer type fuel cell system and having a construction that includes alternating fuel/water flow path defining cells (68) and hot gas flow path cells (69) by providing heat transfer augmentation, such as a lanced and offset fin (120), only in that part of the gas flow path structure (69) adjacent the regions in the fuel/water flow path cells (68) where heating of the liquid fuel/water and vaporizing of the fuel/water where the mixture exists is a two phase material occurs and not in the area adjacent those parts of the fuel/water flow path structure (68) in which superheating of the vaporized fuel/water mixture is occurring.

19 Claims, 4 Drawing Sheets

FUEL VAPORIZER FOR A REFORMER TYPE FUEL CELL SYSTEM

FIELD OF THE INVENTION

This invention relates to vaporizers and, more particularly, to vaporizers of the type that bring a hot heat exchange fluid into heat transfer relation with a liquid that is to be fully evaporated to a super heated vapor.

BACKGROUND OF THE INVENTION

There are many applications for vaporizers of various sorts. In the broadest sense, a vaporizer converts a liquid to a vapor or a two phase mixture of liquid and vapor, or may convert a two phase mixture of vapor and liquid to a wholly, single phase vapor. In some instances, vaporizers may also provide a conversion from the solid phase to the liquid phase en route to providing a vapor or a two phase liquid/vapor mixture.

In some vaporizers, the material to be vaporized is brought into contact with a hot surface that may be heated by a nonfluid medium as, for example, an electrical heating element or by radiation impinging upon the heating surface. In most other cases, however, the vaporization occurs by placing the material to be vaporized on one side of a thermally conductive separator and locating a hot heat exchange fluid on the other side of the separator plate. The heat exchange fluid may be heated gases produced by a chemical reaction or simply some liquid or gaseous fluid that had previously been heated by a reaction or even a heating element or the like. In some cases, the heat exchange fluid may be relatively stationary. However, in many cases, it is desired that the heat exchange fluid be moving to induce turbulence and improve heat exchange coefficients. Generally speaking, it is desirable that the heat exchange fluid be moving countercurrent to the liquid to be vaporized for maximum heat transfer efficiency.

One application for a vaporizer of the latter type is in a particular type of fuel cell system. As is well known, fuel cell systems are attracting considerable attention as an efficient and nonpolluting means of providing traction power for vehicles. Some fuel cell systems operate using relatively pure hydrogen as a fuel source while others utilize a hydrogen rich stream of fuel. Many of the latter type of fuel cell systems are so-called reformer type fuel systems which is to say that they are provided with a hydrogen rich fuel which is then reformed into an even richer hydrogen stream which in turn is passed to the fuel cell of the system. Fuels include methanol, ethanol, gasoline and the like.

In such systems, the fuel is a hydrogen containing liquid which must be vaporized before it is passed on to the system reformer to be reformed into a hydrogen rich gas. One example of a fuel vaporizer that is ideally suited for use in reformer type fuel cell systems is disclosed in the commonly assigned application of Michael J. Reinke et al, Ser. No. 10/145,531, filed May 14, 2002, entitled "Method and Apparatus for Vaporizing Fuel for a Reformer Fuel Cell System" (Attorney's Docket No. 655.00937), the entire disclosure of which is herein incorporated by reference.

It has been found that when a fuel cell system of the reformer type is to be employed in a vehicular application, the fuel charge in the vaporizer should be as small as possible to minimize the time required for the system to respond to a change in load. As is well known, drivers of vehicles propelled by internal combustion engines expect immediate response when they step on the gas pedal or a fuel feed to accelerate as when passing another vehicle. In vehicles propelled by fuel cell systems, a similar response is expected when the driver steps on the fuel cell system equivalent of the gas pedal. As it happens, the greater the charge of fuel in the fuel vaporizer, the slower the response of the fuel cell system to demands of the operator. At the same time, the fuel must be completely vaporized prior to being passed to the system reformer. One way of increasing the effectiveness of the vaporizer is to increase the core length, that is, the length of that part of the heat exchanger housing the fuel flow path and the heated fluid medium path which are in heat exchange relation. However, as this length is increased, response time also increases as a result because the fuel charge in the vaporizer increases as a result of the increased volume that accompanies increased length.

Consequently, to achieve improved efficiency in vaporizers intended for use in such systems, relatively high temperature differentials may be employed to increase the rate of heat transfer within the vaporizer and thus increase the rate of vaporization of the liquid fuel. This, in turn, increases the susceptibility of the vaporizer to thermal fatigue. Since thermal fatigue reduces the useful life of the vaporizer, it is desired to eliminate or minimize thermal fatigue without increasing the system response time, particularly when the fuel cell is employed in a vehicular application.

The present invention is directed to achieving that goal.

SUMMARY OF THE INVENTION

It is a principal object of the invention to improve the response time of a fuel cell system of the reformer type without decreasing the core size of the fuel vaporizer to the point where such would lead to a commensurate decrease in the effectiveness of the vaporizer. It is also a principal object of the invention to accomplish the foregoing while at the same, reducing thermal stress within the vaporizer to thereby improve its useful life.

An exemplary embodiment of the invention achieves the foregoing in a vaporizer for vaporizing a liquid fuel for use in a fuel cell system that includes at least one first cell having an elongated fuel flow path for fuel to be vaporized and having opposite ends with a liquid fuel inlet at one end and a gaseous fuel outlet at the other end. Also included is at least one second hot fluid cell in heat exchange relation with the first cell and having an elongated hot fluid flow path with an inlet end and an opposite outlet end. The inlet end is adjacent the gaseous fuel outlet and the outlet end is adjacent the liquid fuel inlet so that countercurrent flow exists between the fuel and the hot fluid. The fuel flow path is adjacent the hot fluid flow path and is divided into a first heating zone for heating liquid fuel and which is located adjacent the liquid fuel inlet, a second heating zone adjacent the gaseous fuel outlet for superheating vaporized fuel and a third heating zone between the first and second zones in which the fuel changes from liquid phase fuel to gaseous fuel. Heat transfer enhancements are located in the hot fluid flow path in adjacency to the first and third zones and the vaporizer is further characterized by the substantial absence of a heat transfer enhancement in that part of the hot fluid flow path adjacent the second zone.

The absence of any heat transfer enhancements in the hot fluid flow path adjacent the second zone minimizes thermal stress in the area where the innards of the vaporizer are subject to the highest temperatures of the hot fluid and are not substantively cooled by the cold fluid, i.e. the fuel, due to the superheated condition of the fuel in the second zone. The absence of heat transfer enhancement adjacent the second zone also allows for additional enhancements to be located in the first and/or third zone to improve heat transfer efficiency in such zones to the point where the core size of the vaporizer may actually be reduced to improve response time in the fuel cell system with which the vaporizer is used without reducing heat transfer efficiency and/or increasing pressure drop.

In one embodiment of the invention, the second cell has spaced walls defining the hot fluid flow path and further includes spacers extending between the spaced walls to maintain separation between the same. The spacers are located in that part of the hot fluid flow path adjacent the second zone.

In one embodiment, the heat transfer enhancements adjacent the first and third zones comprise a turbulator.

Preferably, the turbulator is bonded to both of the spaced walls.

In one embodiment, the turbulator is a fin and even more preferably, is a high efficiency fin such as a lanced and offset fin.

A highly preferred embodiment contemplates that there be a plurality of each of the first and second cells arranged in a stack in alternating fashion together with headers connecting corresponding inlets and outlets of the first and second cells in the stack.

In such an embodiment, it is preferred that the cells abut one another and include a thermally conductive, separator sheet at their point of abutment which defines a wall that is common to both of the flow paths.

The invention also contemplates a vaporizer of general utility that includes a plurality of first cells, each having an internal flow passage for a liquid to be vaporized and having opposed ends together with a liquid inlet at one of the ends and a vapor outlet at the other of the ends and an internal maze for fluid flow extending between the ends. Also included are a plurality of second cells, each having an internal flow passage defined by spaced walls for a hot fluid and having opposed ends. A hot fluid inlet is located at one of the ends of the hot fluid flow path while a hot fluid outlet is located at the other of the ends of the hot fluid flow path.

The first and second cells are arranged in a stack in alternating fashion and in heat exchange relation with adjacent ones of the cells and with the ends of the first cells having liquid inlets being closely adjacent the ends of the second cells having hot fluid outlets. The ends of the first cells having vapor outlets are closely adjacent the ends of the second cells having hot fluid inlets to provide for countercurrent flow. A turbulator is located in the hot fluid flow passages in each of the cells and extends between and is bonded to the spaced walls thereof. The turbulator has a length beginning adjacent the ends of the corresponding second cells having the hot fluid outlets and terminates well short of the end having the hot fluid inlet so that the hot fluid passage is characterized by the lack of a turbulator for a distance adjacent the hot fluid inlet.

In one embodiment, the maze is formed by criss crossing slots or grooves in fluid communication with one another. Preferably, the criss crossing slots or grooves are located in at least some of the plates of which the first cells are formed.

The invention further contemplates a method of vaporizing fuel having the steps of (a) providing a thermally conductive elongated wall having opposite sides, (b) flowing a stream of hot fluid along one side of the wall generally in the direction of elongation thereof, and (c) flowing a fuel stream initially in the liquid phase along the other side of the wall in countercurrent relation to the hot fluid stream to cause the liquid fuel to first be heated in a first region along the wall and then to be transformed from the liquid phase to the vapor phase along a second region of the wall, and then superheated to a superheated vapor phase along a third region of the wall. The method includes the improvement wherein (d) prior to the performance of steps (b) and (c), a heat transfer enhancement is provided on the one side of the wall only at locations on the one side opposite the first and second regions.

Preferably, the wall is formed of a metal sheet.

Even more preferably, the heat transfer enhancement is a metallic fin metallurgically bonded to the sheet. The fin may be a high efficiency fin such as a lanced and offset fin.

Other objects and advantages will become apparent from the following specification taken in connection with the accompanying drawings.

DESCRIPTION OF THE PREFERRED EMBODIMENT

The present invention will be described in the context of use in a reformer type fuel cell system. However, the vaporizer of the invention is not limited to use in such systems or to the vaporization of fuel. It can be employed with efficacy in any context requiring a vaporizer operating with relatively high temperature differentials and which superheats the vaporized material to minimize thermal stress in that part of the vaporizer wherein the material being vaporized is superheated. Thus, no restriction to fuel cells or the vaporizing of fuel is intended except to the extent set forth in the appended claims.

Figure 1:
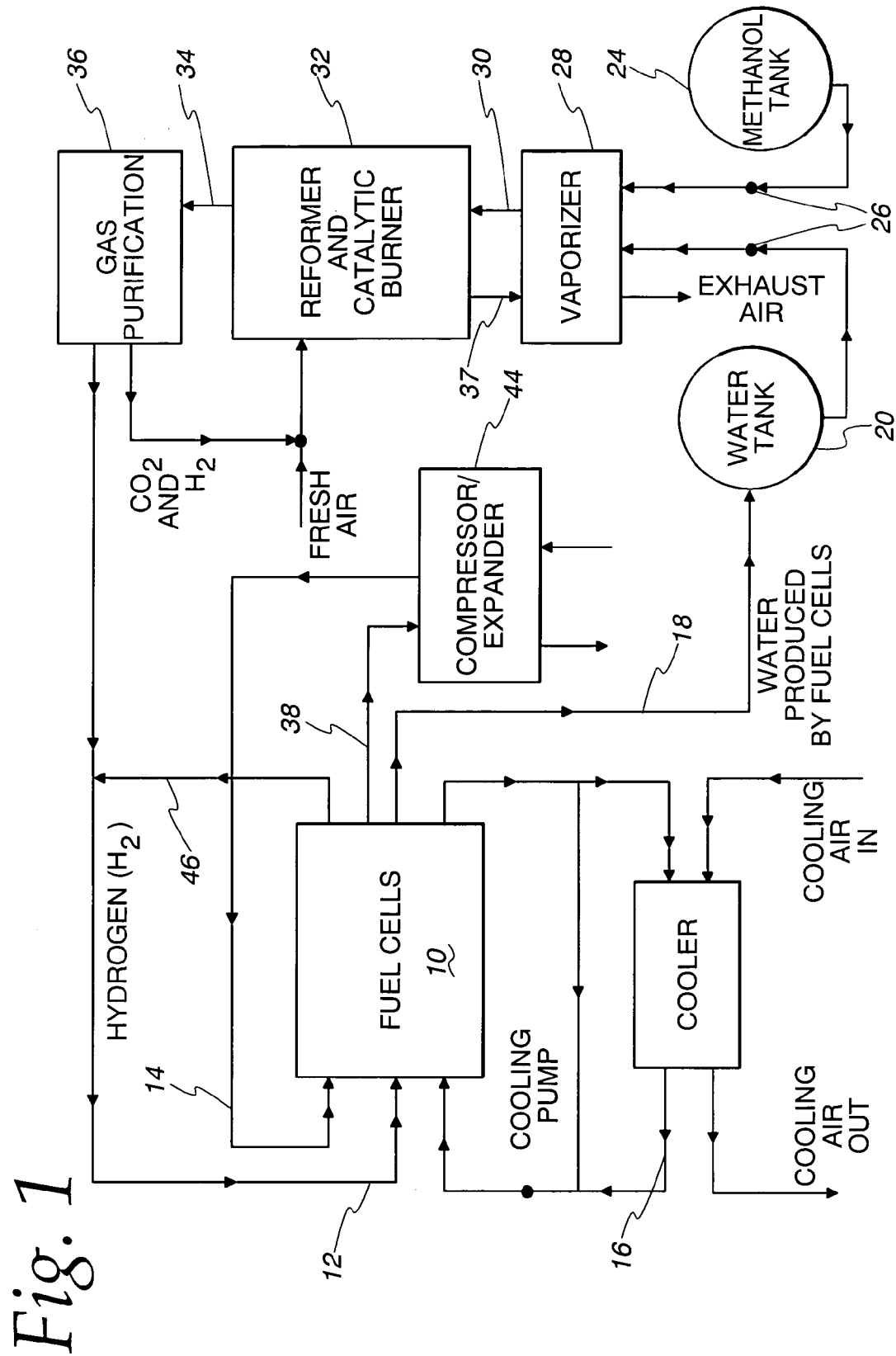
FIG. 1 is a schematic view of a reformer type fuel cell system embodying a fuel vaporizer made according to the invention.

Turning now to FIG. 1, one type of fuel cell system embodying a reformer with which the invention may be used is illustrated in FIG. 1. This system is specifically intended to be employed in a vehicle but may be used to advantage in other environments.

The system includes a fuel cell 10 with provision for an anode gas inlet stream on a line 12. The anode gas typically will be hydrogen, carbon dioxide, and water vapor.

The fuel cell also includes an inlet line 14 leading to the cathode side of the fuel cell and through which an oxygen rich stream is received. In the usual case, the stream will be air.

The fuel cell also includes a cooling loop, generally designated 16, as is well known.

The cathode exhaust is discharged on a line 18 which eventually leads to a water tank or reservoir 20. That is to say, water, the product of the chemical reaction within the fuel cell 10, is provided to the water tank 20 for later reuse in the reforming process.

In addition to the water tank 20, the system includes a fuel tank 24 which, in the system shown, contains methanol. Pumps 26 that are electrically driven by battery power during start-up or by the electricity produced by the fuel cell 10 during operation, meter water and methanol in a desired ratio to a common inlet or separate inlets of a fuel vaporizer 28 made according to the invention. (A common inlet is disclosed herein and is preferred but the invention contemplates the use of separable inlets as well.) The water/methanol mixture is vaporized and discharged on a line 30 to the inlet of a reformer and catalytic burner 32. The reformer and catalytic burner 32 in turn discharges reformate (hydrogen, water, carbon monoxide and carbon dioxide) on a line 34 to a gas purification reactor 36 where the carbon monoxide content of the gas is reduced to the point where it will not poison the fuel cell 10. The gas purification reactor 36 discharges to the inlet line 12 to the anode of the fuel cell 10.

Hot so-called tail gas generated in the reformer and catalytic burner 32 is discharged on a line 37 to the vaporizer 28 to serve as a source of heat to vaporize the methanol and water therein.

The system also includes an exhaust line 38 on which exhaust gas is discharged. The exhaust gas is expanded through a compressor/expander 44 and discharged as exhaust. A recirculation line 46 for hot gas may also be provided.

Electric power generated by the fuel cell 10 is employed, during operation, to drive pumps, motors, etc. within the system as well as to provide electric power for the load to be driven by the system. For start up, battery power may be used. In the case of a vehicular propulsion system, the load will typically be an electric motor coupled to the vehicle traction system.

Figure 2:
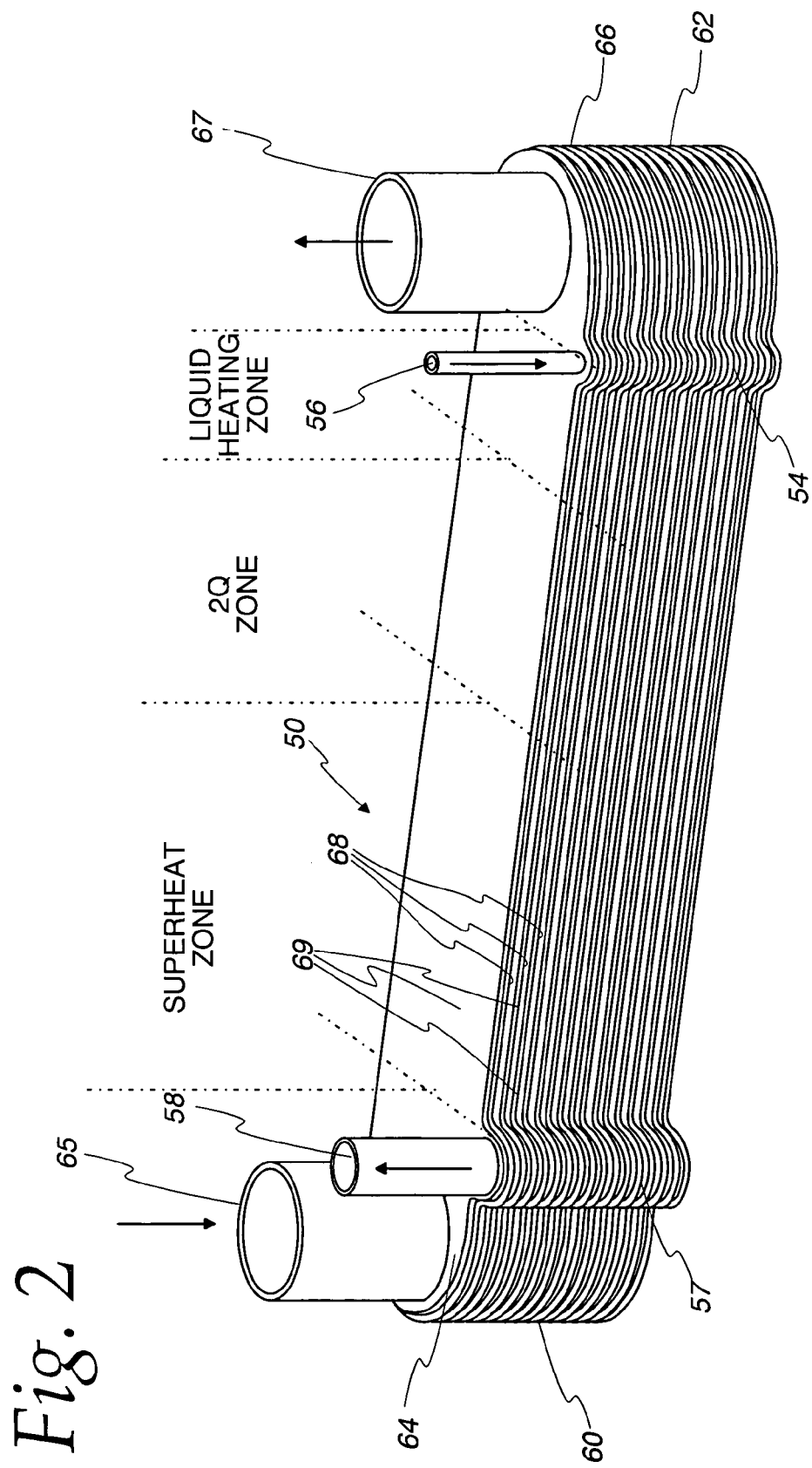
FIG. 2 is a perspective view of one embodiment of the vaporizer.

Turning now to FIG. 2, a preferred form of a fuel vaporizer 28 made according to the invention is illustrated. The same includes a core 50 made up of a series of plates, bars and/or flanges on the peripheries of the plates, spacers and fins to be described in greater detail hereinafter. These components define a fuel/water flow path and a heated heat exchange medium flow path through the vaporizer. The heated heat exchange media typically will be a hot gas, such as tail gas, but a heated liquid could also be employed. A liquid fuel and water inlet to the fuel/water flow path is provided by a header 54 and a relatively small diameter tube 56 connected thereto. A similar header 57 supports a large diameter tube 58 which serves as a vaporized fuel outlet. The difference in size of the tubes 56 and 58 is due to the fact that the fuel and water mix enters the tube 56 as a liquid and thus is at a relatively greater density than the fuel exiting through the outlet tube 58 which is in vapor form. (Typically the density of the liquid entering the vaporizer will be on the order of two hundred times the density of the fuel and water vapor exiting the vaporizer.) Consequently, to avoid a large pressure drop, because of the greater volumetric flow rate at the outlet tube 58, the outlet tube 58 has a larger cross-sectional area.

The core 50 has opposed ends 60 and 62. The end 60 is an inlet end for the heated media and includes an inlet header 64. A hot gas inlet tube 65 extends to the header 64. The end 62 is an outlet end for the heated media and includes an outlet header 66 from which a hot gas outlet tube 67 extends. The header 64 is connected to receive hot tail gas from the reformer and catalytic burner 32 (FIG. 1) and deliver it through the hot gas fluid flow passages that are in heat exchange relation with the hot gas flow path which is in the form of a plurality of passages as well.

The core 50 is a stack of the previously mentioned components that define alternating fuel/water flow path structures 68 and hot gas flow path structures 69. It is to be noted that the inlet and outlet headers 64,66 for the hot gas optionally could be pyramid shaped housings (not shown) having a round opening (not shown) at their apexes and an opposite, open base (not shown) which is in fluid communication with the hot gas fluid flow paths (not shown) within the core 50.

Figure 3:
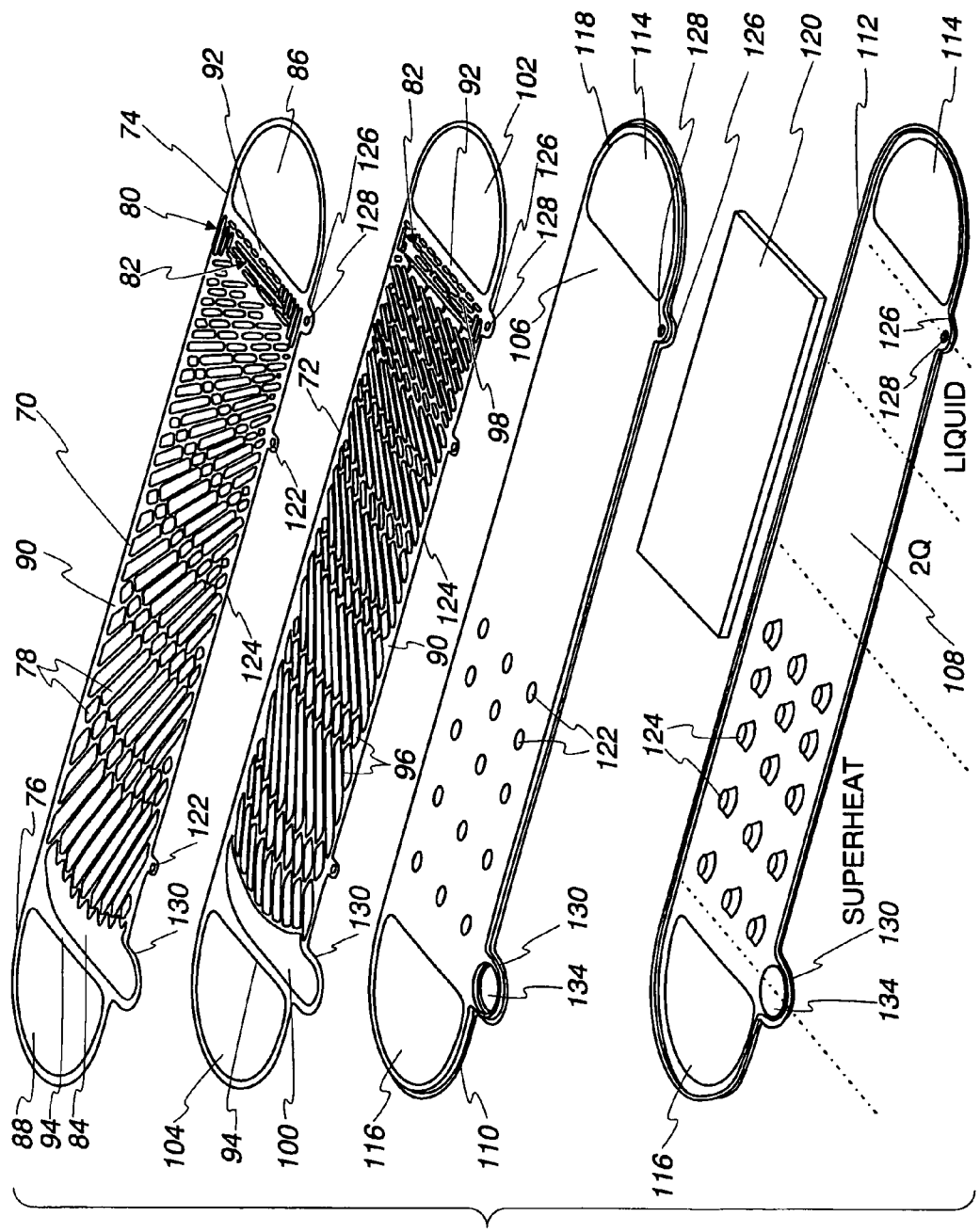
FIG. 3 is an exploded view of components defining a fuel flow path and a hot fluid medium flow path.

Turning to FIG. 3, both a typical fuel side subassembly constituting the methanol/water flow path defining structure 68 and a typical hot gas side subassembly defining the hot gas flow path defining the structure 69 are shown in an exploded view. The fuel side subassembly includes two plates 70,72 that are superimposed upon each other. The plates 70 include an upstream end 74 and a downstream end 76.

The plate 70 includes a plurality of angled elongated slots 78 intermediate the ends 74 and 76. Adjacent the end 74 is a series of slots which define a part 80 of a maze, generally designated 82, for purposes to be seen. Adjacent the opposite end 76, an enlarged opening 84 is present. Further, additional enlarged openings 86,88 are disposed just beyond the ends 74,76 for purposes to be seen. The plate 70 also includes a solid section or boundary 90 about its entire periphery as well as a solid section 92 isolating the enlarged opening 86 from the maze 82 and a solid section 94 isolating the enlarged opening 88 from the enlarged opening 84.

The plate 72 also includes angled elongated slots 96, a series of slots 98 also defining part of the maze 82, an enlarged opening 100 and additional enlarged openings 102,104 which are located past the ends of the plate 72 defined by the enlarged opening 100 and the maze 82. The plate 72 also includes the solid border 90 and the solid sections 92 and 94. The arrangement is such that the plates 70 and 72 can be superimposed upon one another with their borders 90 and solid sections 92,94 aligned with and in contact with one another thereby providing alignment of the enlarged opening 88 with the enlarged opening 104, and alignment of the enlarged opening 86 with the enlarged opening 102. Further, the angled slots 78,96 will then criss-cross each other. The other enlarged openings 84,100 are also aligned with one another as are the slots 80,98 making up the maze. In some cases, slots may be eliminated in favor of criss-crossing grooves at the interface of the plates 70 and 72.

Also shown in FIG. 3 are two separator plates 106,108. The plate 106 includes a down turned, peripheral flange 110 while the separator plate 108 includes an upturned peripheral flange 112 which is adapted to abut the flange 110 and be sealed thereto as, for example, by suitable bonding such as brazing. However, other metallurgical, fluid tight bonds such as welds or soldering could be employed if desired.

The plates 106 and 108 also include enlarged openings 114 and 116 at their opposite ends. The enlarged openings 114 and 116 align with the enlarged openings 86,102, and 88,104, respectively. The border 118 of the separator plate 106 opposite the flange 110 is sealed and bonded to the boundary 90 of the plate 72 as by any metallurgical bond as mentioned previously while the border of the separator plate 108 (not shown) would be sealed and bonded to the boundary 90 of a plate 70 (not shown), that is the next lowermost plate in the stack.

Figure 4:
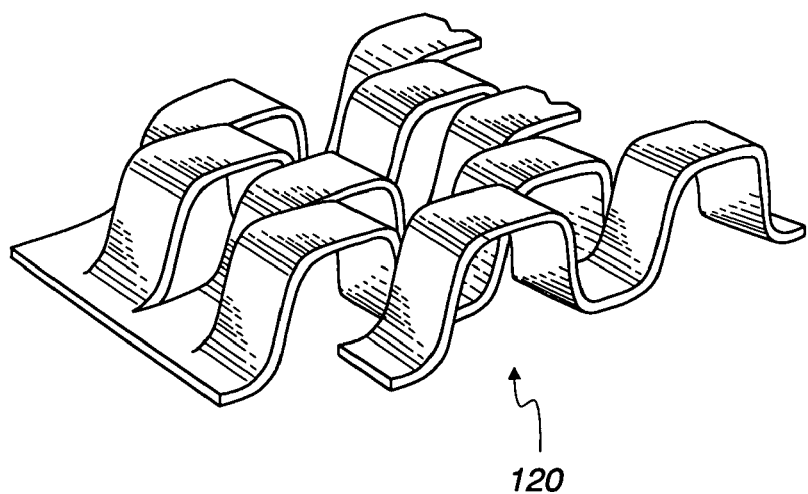
FIG. 4 is a fragmentary, perspective view of a preferred form of a heat transfer enhancement utilized in the hot fluid flow path.

Because of the presence of the engaging flanges 110, 112 on the separator plates 106 and 108, there will be a space that extends between the openings 114, 116 which serves as a hot gas or heated fluid medium passageway. To promote excellent heat exchange, a turbulator or fin 120 is located therein and is disposed between the openings 114, 116. The fin 120 is a high efficiency fin and preferably a conventional lanced and offset fin such as shown in FIG. 4. The fin can be made in one or more sections which may or may not include small spaces between adjacent sections.

According to the invention, the fin 120 serves as a heat transfer enhancement for the hot media as it passes through the hot media flow path between the openings 114,116. In this respect, it will be appreciated from a comparison of FIGS. 2 and 3, that the openings 116 define the inlet ends of the hot fluid flow path while the openings 114 define the outlet ends. As seen in FIG. 3, the fin 120 does not extend the entire length of the flow path between the openings 114 and 116. Rather, it is located closely adjacent the openings 114 and in the usual case will extend roughly half way from the opening 114 to the opening 116.

As generally alluded to previously, and as designated by appropriate legends in FIGS. 2 and 3, three things occur within the vaporizer. First, liquid fuel and water are supplied to the fuel flow path through the inlet tube 56 to the individual cells making up the maze via the openings 128. In the usual case, this fuel will be below the boiling point of the fuel water mixture and consequently, will be heated to the boiling point generally almost entirely within the maze 82. This area is shown in FIGS. 2 and 3 by the legends "liquid heating zone" and "liquid" in FIGS. 2 and 3 respectively.

As the liquid exits the liquid heating zone, it enters a zone where vaporization begins to occur and whereat the fuel/water mixture exists in two phases, the liquid phase and the gaseous phase. The proportion of the fuel/water mixture that is in the liquid phase progressively decreases as the fuel water mixture moves toward the openings 84, 100 and the outlet manifold 58 connected thereto until, at a point roughly halfway along the length of the core, all of the fuel/water mixture is vaporized. As the fuel/water mixture continues to move through the vaporizer, it is further heated and given a substantial degree of superheat in a third zone which is labeled "superheat zone" or "superheat" in FIGS. 2 and 3 respectively.

According to the invention, the fin 120 extends no further than the beginning of the superheat zone. That is to say, heat transfer enhancements in the hot fluid flow path are present only in areas of that flow path that are adjacent the liquid heating zone and the two phase zone of the fuel/water mixture flow path. It is preferable to have the heat transfer enhancements end just prior to the end of the two phase zone to insure that no superheating of the fuel/water mixture occurs in a region contacting heat transfer enhancements.

To maintain separation of the separator plates 106, 108 in their area adjacent the superheat zone of the fuel/water flow path, spacers are employed. In the embodiment illustrated, both plates have facing dimples with the plate 106 having downwardly directed dimples 122 as seen in FIG. 3 and the plate 108 having upwardly directed dimples 124 as also shown in FIG. 3. The dimples 122 and 124 contact each other and are metallurgically bonded to one another to preserve this desired spacing between the separator plates 106,108 in the superheat zone. The desired spacing in the liquid and two phase zones is maintained by the lanced and offset fin 120.

It will be appreciated that forms of spacers other than the dimples 122 and 124 could be used. For example, an inefficient fin such as a square wave fin having a fin density substantially less than that of the lanced and offset fin 120 could be used.

Those skilled in the art will also recognize that the dimples or a low fin density fin utilized as a spacer will, to some degree enhance heat transfer within the superheat zone. However, it is highly desirable, to avoid undesirably high thermal stresses in that zone for reasons that will appear. Consequently, such spacers are employed only for the purpose of structural integrity and not to provide heat transfer enhancement. Thus, the super-heat zone portion of the hot fluid flow path between the plates 106,108 is characterized by the substantial absence of heat transfer enhancements even though, to a minor degree, heat transfer in that region will be enhanced somewhat by the presence of the spacers. In this regard, the total resistance to heat transfer between the hot fluid and the fuel can be mathematically represented as a first convective resistance R, between the bulk hot fluid and the wall separating the hot fluid and the fuel, which is connected in series to a second conductive resistance $R_2$ through the thickness of the wall, which is connected in series to a third convective resistance $R_3$ between the wall and the bulk fuel, the sum total of these three resistances comprising the total resistance $R_T$. It is typical that the magnitude of the second resistance $R_2$ is negligible in comparison to the magnitude of the first and third resistances, $R_1$ and $R_3$, and the total resistance $R_T$ to heat transfer between the hot fluid and the fuel can therefore be represented as the sum total of the first and third resistance ($R_T=R_1+R_3$), with a negligible temperature gradient through the thickness of the wall separating the hot fluid and the fuel. The temperature of the wall separating the hot fluid and the fuel would then be determined by the algebraic ratio of the first resistance $R_1$ to the total resistance $R_T$, this ratio ($R_1/R_T$) being the same as the algebraic ratio of the difference between the bulk hot fluid temperature and the wall temperature to the difference between the bulk hot fluid temperature and the bulk fuel temperature. In the second zone, this ratio ($R_1/R_T$) will be very nearly 1, due to the very low thermal resistance inherent in the flow boiling heat transfer mechanism present on the fuel side in this zone. The "substantial absence" of a heat transfer enhancement in that part of the hot fluid flow path adjacent the second zone can be quantified by the amount in which it decreases the difference between this ratio in the second zone $(R_1/R_T)_2$ and this ratio in the third zone $(R_1/R_T)_3$ of the vaporizer. Preferably, the amount of reduction in this ratio from the second zone to the third zone is less than 0.5; $((R_1/R_T)_2-(R_1/R_T)_3<0.5)$ even more preferable is a reduction of less than 0.25 $((R_1/R_T)_2-(R_1/R_T)_3<0.25)$. Thus, "substantial absence" in the context of the invention means the absence of any structures or surface treatments except to the extent that spacers required to maintain the spacing between the plates 106, 108 and having the primary purpose of serving as spacers and not as heat transfer enhancements are allowed such that the equation $((R_1/R_T)_2-(R_1/R_T)_3<0.5)$ is satisfied.

Figure 5:
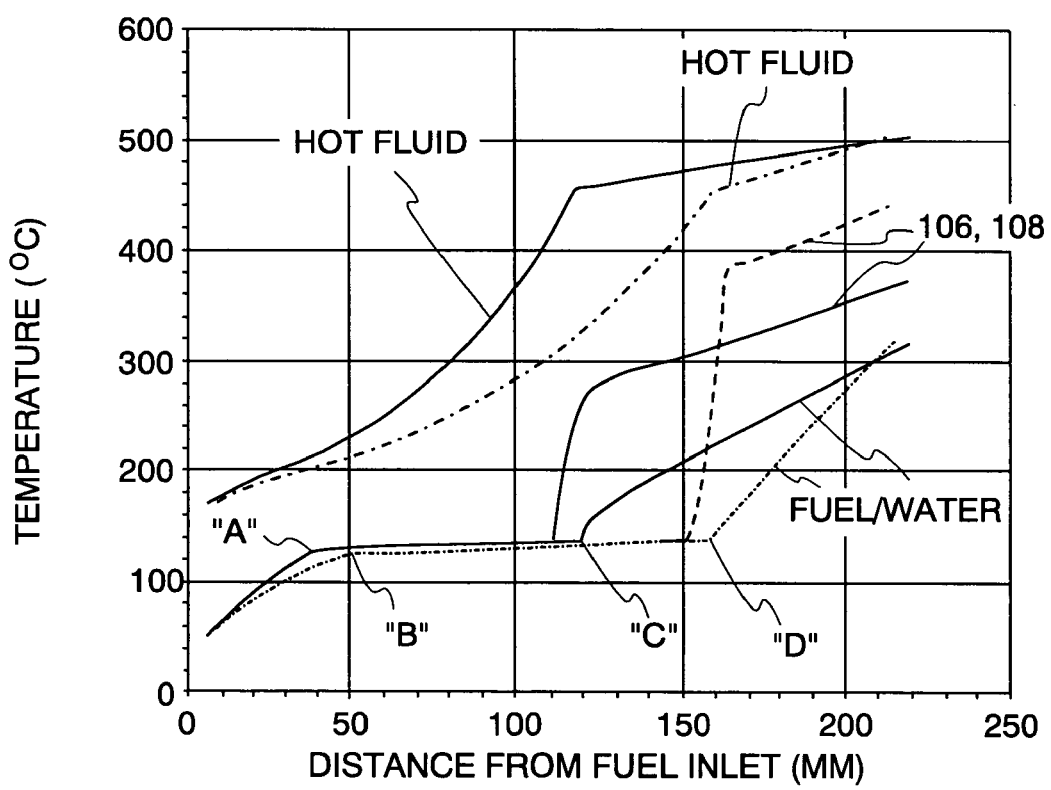
FIG. 5 is a graph comparing the predicted performance of two otherwise identical fuel vaporizers, one made according to the previously identified application of Reinke et al and another made according to the present invention.

FIG. 5 is a computer generated graph showing predicted performance of two fuel vaporizers, one made according to the invention with certain characteristics shown in solid lines and the other made with a full length fin 120 that extends not only through the liquid and two phase zones but through the superheat zone as well, shown in dotted lines. In the vaporizers of concern, temperature in ° C. is plotted against the distance, in millimeters, from the fuel/water inlet toward the fuel/water outlet. The designations "hot fluid" refer to the plot of temperature of the hot fluid flowing between the plates 106, 108 whereas the designations "106, 108" plot the temperature of the plates 106,108 themselves at various locations along the flow path. The designations "fuel/water" show the temperature of the fuel/water mixture at various distances from the fuel/water inlet. As can be appreciated from FIG. 5, the solid line comparisons for the vaporizer made according to the invention show that the plates 106, 108 run at a considerably lower temperature than do the plates 106, 108 in the full length fin version. At the same time, in both cases, it is seen that at 200 millimeters, the fuel/water temperature is generally the same with a slight advantage in heat transfer efficiency going to the vaporizer made according to the invention.

Interestingly, it will be noted that the point at which heating of the fuel/water mixture is heated to its boiling point, labeled "A" in FIG. 5, occurs closer to the inlet in the vaporizer made according to the invention than does the corresponding point, labeled "B" in FIG. 5, for the full length fin version of the vaporizer. Similarly, the point "C" at which superheating of the fuel/water mixture occurs in a vaporizer made according to the invention is much closer to the inlet than the point "D" where superheating begins to occur in the full fin length version.

These differences have significance when one considers that the volume of the fuel flow path in both vaporizers was the same. Specifically, a lesser length of that path is occupied by fuel in the liquid phase in the case of the vaporizer made according to the invention than in the case of the vaporizer made with a full length fin. Since the fuel in the liquid phase is considerably more dense than the two phase fuel or wholly gaseous fuel, it will be appreciated that the fuel/water charge in the vaporizer made according to the invention is less than that with the full fin vaporizer. Again, compare points A and B. This advantage is further accentuated somewhat by the fact that in the vaporizer made according to the invention, superheating begins closer to the inlet than is the case with the full fin vaporizer. Typically, the fuel charge in vaporizer made according to the invention will be 25–30% less than in the full fin vaporizer thereby providing an increase in response time as well.

In vaporizers of this type, one constraint in the vaporizer design is the allowable hot fluid media pressure drop because the pressure available for driving the same through the vaporizer is limited by system cost, size and weight constraints. It should be noted that by way of explanation of the foregoing, the superheat region does not require a highly optimized hot fluid fin. This is in contrast to the need for a highly optimized fin, particularly in the liquid heating region. The resistance to convective heat transfer at the plates 106, 108 with which the fuel vapor is in contact is much higher than the resistance to heat transfer on those surfaces with which the hot fluid media is in contact since there is virtually no surface augmentation (heat transfer enhancement) on the fuel side. This is in contrast to the conditions in the liquid heating and two phase regions where the higher heat transfer coefficients more than make up for the lack of surface augmentation on the fuel side of the separator plates 106, 108. It appears that the inability of the fuel to adequately absorb heat from the separator plates 106, 108, once the fuel has reached a fully gaseous state is what causes the large thermal stresses on the hot fluid media inlet end. By eliminating fin 120 in the area where it is least effective, the large thermal stresses that occur in that area are considerably reduced because the elimination of the fin has the effect of keeping the separator sheets 106, 108 at temperatures closer to the temperature of the cooler fuel/water vapor rather than that of the hot fluid media.

The resulting increased resistance to heat transfer causes an increase in the length of the region of superheat required to elevate the fuel/water vapor to the desired temperature as shown by the difference in points "C" and "D" in FIG. 5. However, the reduction of the flow length through the fin 120 results in a reduction in hot gas media pressure drop which is then taken advantage of by increasing the heat transfer augmentation in the liquid heating and two phase regions. Thus, FIG. 5 shows that it is possible to sufficiently shorten the liquid heating and two phase regions so that the total length of the vaporizer remains unchanged. Consequently, a vaporizer made according to the invention, where the fin is removed from the hot fluid media flow path region adjacent the region in which the superheating of the fuel occurs has the double advantage of decreased fuel charge and reduced thermal stresses without any change in size, effectiveness of the vaporizer or pressure drop in the system.

Thus, a vaporizer made according to the invention achieves the objects set forth heretofore.

The invention claimed is:

1. A vaporizer system comprising:
   a source of hot fluid;
   a source of liquid to be vaporized:
   a plurality of first cells each having an internal flow passage for a liquid to be vaporized and having opposed ends, a liquid inlet at one of said ends, a vapor outlet at the other of said ends and an internal maze for fluid flow extending between said ends, the liquid inlet connected to the source of liquid to be vaporized to receive the liquid therefrom, the vapor outlet connected to another component of the system to supply vaporized liquid thereto;
   a plurality of second cells, each having an internal flow passage defined by spaced walls for a hot fluid and having opposed ends, a hot fluid inlet at one of said ends, and a hot fluid outlet at the other of said ends, each of the hot fluid inlets connected to the hot fluid source to receive the hot fluid therefrom;
   said first and second cells being arranged in a stack in alternating fashion and in heat exchange relation with adjacent ones of said cells and with the ends of the first cells having liquid inlets being closely adjacent the ends of the second cells having hot fluid outlets and with the ends of the first cells having vapor outlets being closely adjacent the ends of the second cells having hot fluid inlets to provide for countercurrent flow of said liquid to be vaporized and said hot fluid within the vaporizer; and
   a turbulator in said hot fluid flow passage in each second cell and extending between and bonded to the spaced walls thereof, said turbulator having a length beginning adjacent the ends of the corresponding second cell having said hot fluid outlet and terminating well short of the end having said hot fluid inlet so that said hot fluid passage is characterized by the lack of a turbulator for a distance adjacent said hot fluid inlet.

2. The vaporizer of claim 1 wherein said first cells and said second cell walls are formed by plates.

3. A vaporizer comprising:
   a plurality of first cells each having an internal flow passage for a liquid to be vaporized and having opposed ends, a liquid inlet at one of said ends, a vapor outlet at the other of said ends and an internal maze for fluid flow extending between said ends;
   a plurality of second cells; each having an internal flow passage defined by spaced walls for a hot fluid and having opposed ends, a hot fluid inlet at one of said ends, and a hot fluid outlet at the other of said ends;
   said first and second cells being arranged in a stack in alternating fashion and in heat exchange relation with adjacent ones of said cells and with the ends of the first cells having liquid inlets being closely adjacent the ends of the second cells having hot fluid outlets and with the ends of the first cells having vapor outlets being closely adjacent the ends of the second cells having hot fluid inlets to provide for countercurrent flow of said liquid to be vaporized and said hot fluid within the vaporizer; and a turbulator in said hot fluid flow passage in each second cell and extending between and bonded to the spaced walls thereof, said turbulator having a length beginning adjacent the ends of the corresponding second cell having said hot fluid outlet and terminating well short of the end having said hot fluid inlet so that said hot fluid passage is characterized by the lack of a turbulator for a distance adjacent said hot fluid inlet;

wherein said first cells and said second cell walls are formed by plates, and said maze is formed by criss crossing slots or grooves in fluid communication with one another.

4. The vaporizer of claim 3 wherein said criss crossing slots or grooves are located in at least some of the plates of which said first cells are formed.

5. A vaporizer comprising:

a plurality of first cells each having an internal flow passage for a liquid to be vaporized and having opposed ends, a liquid inlet at one of said ends, a vapor outlet at the other of said ends and an internal maze for fluid flow extending between said ends;

a plurality of second cells, each having an internal flow passage defined by spaced walls for a hot fluid and having opposed ends, a hot fluid inlet at one of said ends, and a hot fluid outlet at the other of said ends;

said first and second cells being arranged in a stack in alternating fashion and in heat exchange relation with adjacent ones of said cells and with the ends of the first cells having liquid inlets being closely adjacent the ends of the second cells having hot fluid outlets and with the ends of the first cells having vapor outlets being closely adjacent the ends of the second cells having hot fluid inlets to provide for countercurrent flow of said liquid to be vaporized and said hot fluid within the vaporizer; and a turbulator in said hot fluid flow passage in each second cell and extending between and bonded to the spaced walls thereof, said turbulator having a length beginning adjacent the ends of the corresponding second cell having said hot fluid outlet and terminating well short of the end having said hot fluid inlet so that said hot fluid passage is characterized by the lack of a turbulator for a distance adjacent said hot fluid inlet further including spacers between the said second cell walls in said distance adjacent said hot fluid inlet and maintaining the walls of each said second cell in spaced relation.

6. The vaporizer of claim 5 wherein said spacers still allow for the substantial absence of heat transfer enhancements in said distance adjacent said hot fluid inlet.

7. In a vaporizer for vaporizing a liquid fuel for use in a fuel cell system, at least one first cell having an elongated fuel flow path for fuel to be vaporized and having opposite ends with a liquid fuel inlet at one said end and a gaseous fuel outlet at the other said end, the liquid fuel inlet connected to a fuel source, and the gaseous fuel outlet connected to another component of the fuel cell system;

at least one second hot fluid cell in heat exchange relation with said first cell and having an elongated hot fluid flow path with an inlet end and an opposite outlet end, said inlet end connected to another component of the fuel cell system to receive hot fluid therefrom;

said inlet end being adjacent said gaseous fuel outlet and said outlet end being adjacent said liquid fuel inlet so that countercurrent flow will exist between the fuel and the hot fluid;

said fuel flow path being adjacent said hot fluid flow path and divided into a first heating zone for heating liquid fuel and located adjacent said liquid fuel inlet, a second heating zone adjacent said gaseous fuel outlet for superheating vaporized fuel and a third heating zone between said first and second zones in which fuel changes from the liquid phase fuel to the gaseous fuel phase; and a heat transfer enhancement in said hot fluid flow path in adjacency to said first and third zones;

said vaporizer being characterized by the substantial absence of heat transfer enhancements in that part of said hot fluid flow path adjacent said second zone.

8. The vaporizer of claim 7 wherein there are a plurality of each of said first and second cells arranged in a stack in alternating fashion, and headers connecting corresponding inlets and outlets of said first and second cells in said stack.

9. The vaporizer of claim 7 wherein said cells abut one another and include a thermally conductive separator sheet at their point of abutment defining a wall common to both said flow paths.

10. In a vaporizer for vaporizing a liquid fuel for use in a fuel cell system, at least one first cell having an elongated fuel flow path for fuel to be vaporized and having opposite ends with a liquid fuel inlet at one said end and a gaseous fuel outlet at the other said end;

at least one second hot fluid cell in heat exchange relation with said first cell and having an elongated hot fluid flow oath with an inlet end and an opposite outlet end;

said inlet end being adjacent said gaseous fuel outlet and said outlet end being adjacent said liquid fuel inlet so that countercurrent flow will exist between the fuel and the hot fluid;

said fuel flow oath being adjacent said hot fluid flow path and divided into a first heating zone for heating liquid fuel and located adjacent said liquid fuel inlet, a second heating zone adjacent said gaseous fuel outlet for superheating vaporized fuel and a third heating zone between said first and second zones in which fuel changes from the liquid phase fuel to the gaseous fuel phase; and a heat transfer enhancement in said hot fluid flow path in adjacency to said first and third zones;

said vaporizer being characterized by the substantial absence of heat transfer enhancements in that part of said hot fluid flow path adjacent said second zone wherein said second cell has spaced walls defining said hot fluid flow path and further including spacers extending between said spaced walls to maintain separation between the same and located in said part of said hot fluid flow path adjacent said second zone.

11. The vaporizer of claim 10 wherein said heat transfer enhancements adjacent said first and third zones comprise a turbulator.

12. The vaporizer of claim 11 wherein said turbulator is bonded to said spaced walls.

13. The vaporizer of claim 12 wherein said turbulator is a fin.

14. The vaporizer of claim 13 wherein said fin is a lanced and offset fin.

15. In a vaporizer for vaporizing a liquid fuel for use in a fuel cell system, at least one first cell having an elongated fuel flow path for fuel to be vaporized and having opposite ends with a liquid fuel inlet at one said end and a gaseous fuel outlet at the other said end;

at least one second hot fluid cell in heat exchange relation with said first cell and having an elongated hot fluid flow path with an inlet end and an opposite outlet end;

said inlet end being adjacent said gaseous fuel outlet and said outlet end being adjacent said liquid fuel inlet so that countercurrent flow will exist between the fuel and the hot fluid;

said fuel flow path being adjacent said hot fluid flow path and divided into a first heating zone for heating liquid fuel and located adjacent said liquid fuel inlet, a second heating zone adjacent said gaseous fuel outlet for superheating vaporized fuel and a third heating zone between said first and second zones in which fuel changes from the liquid phase fuel to the gaseous fuel phase; and a heat transfer enhancement in said hot fluid flow path in adjacency to said first and third zones;

said vaporizer being characterized by the substantial absence of heat transfer enhancements in that part of said hot fluid flow path adjacent said second zone wherein there is a first convective resistance $R_1$ between the hot fluid and a structure between the adjacent fuel flow and hot fluid flow paths, a convective resistance $R_3$ between said structure and the fuel, a total convective resistance $R_T$ which equals $R_1+R_3$, a convective resistance ratio $(R_1/R_T)_3$ in the third zone, a convective resistance $(R_1/R_T)_2$ in the second zone, and the difference between the second convective resistance ratio and the third convective resistance ratio is less than 0.25.

16. In a method of vaporizing fuel comprising the steps of:

(a) providing a thermally conductive elongated wall having opposite sides;

(b) flowing a stream of hot fluid along one side of said wall generally in the direction of elongation thereof;

(c) flowing a stream of fuel that is initially in the liquid phase along the other side of the wall in countercurrent relation to said hot fluid stream to cause the liquid fuel to first be heated in a first region along the wall and then to be transformed from the liquid phase to the vapor phase along a second region of the wall and then superheated vapor phase along a third region of the wall, the improvement including the step of (d) prior to the performance of steps (b) and (c), providing a heat transfer enhancement on said one side of said wall only at locations on said one side opposite said first and second regions, such that there is a substantial absence of transfer enhancements on said one side of said wall at the third region.

17. The method of claim 16 wherein said wall is formed of a metal sheet.

18. The method of claim 17 wherein said heat transfer enhancement is a metallic fin metallurgically bonded to said sheet.

19. The method of claim 18 wherein said fin is a high efficiency fin such as a lanced and offset fin.

\* \* \* \* \*

UNITED STATES PATENT AND TRADEMARK OFFICE
CERTIFICATE OF CORRECTION

| | |
|---|---|
| PATENT NO. | : 7,063,047 B2 |
| APPLICATION NO. | : 10/663409 |
| DATED | : June 20, 2006 |
| INVENTOR(S) | : Michael J. Reinke et al. |

It is certified that error appears in the above-identified patent and that said Letters Patent is hereby corrected as shown below:

Column 12, line 36, delete "oath" and substitute therefor --path--.

Signed and Sealed this

Third Day of April, 2007

JON W. DUDAS
*Director of the United States Patent and Trademark Office*